Sept. 20, 1960 J. RYWAK 2,953,695
GATING CIRCUITS
Filed Aug. 15, 1958
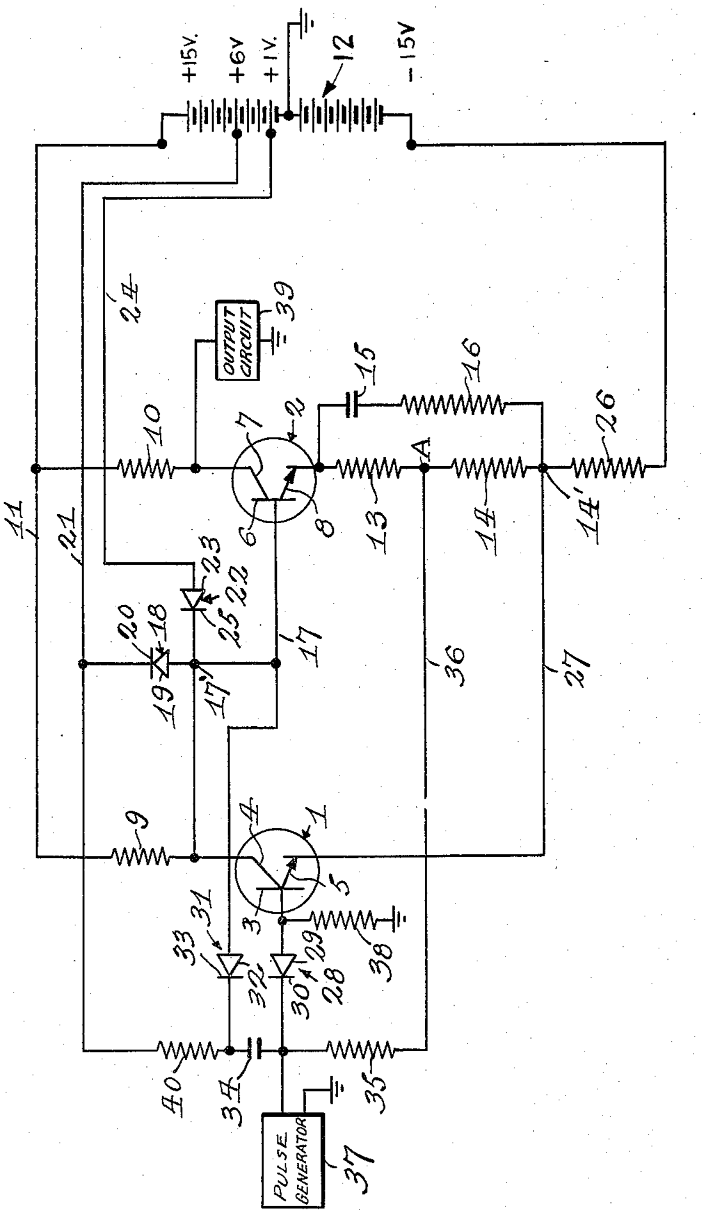
Inventor
JOHN RYWAK
By Robert B. Harmon
Attorney United States Patent Office 2,953,695

Patented Sept. 20, 1960

2,953,695

GATING CIRCUITS

John Rywak, Belleville, Ontario, Canada, assignor to Northern Electric Company, Limited, Montreal, Quebec, Canada, a corporation of Canada Filed Aug. 15, 1958, Ser. No. 755,176

2 Claims. (Cl. 307—88.5)

This invention relates to gating circuits and more particularly to circuits of the steering gate type.

Many gating circuits of the steering gate type have been devised for selectively coupling the output of a circuit to the input of another circuit. A gating circuit of this type is the bistable multivibrator gating circuit in which there are two states of stable equilibrium, the circuit remaining in one quiescent state until its action is initiated by a pulse of a predetermined polarity which changes the circuit to another quiescent state, the pulse being applied to one or other active element of the multivibrator. Circuits of this nature have, however, suffered from a lack of speed or sensitivity or both.

An object of this invention is to provide a bistable electronic multivibrator steering gate with improved operating characteristics.

Another object of this invention is to provide a bistable electronic multivibrator steering gate employing a driving pulse which is always of the same polarity.

Another object of this invention is to provide a bistable electronic multivibrator steering gate under the control of the bistable electronic multivibrator in such a manner that the output frequency of the multivibrator will be one half of the input frequency.

These and other objects of this invention are attained by providing a pair of transistors arranged in a bistable multivibrator circuit modified by the inclusion therein of a pair of diodes, the latter diodes being statically biased so as to steer the input pulse of a predetermined polarity to a respective transistor, the polarity of static bias of the diodes being modified by the energizing of a respective transistor to change the circuit from one quiescent state to the other.

A better understanding of the invention may be attained by referring to the following description taken in conjunction with the accompanying drawing in which the invention is represented.

Considering the drawing, there is shown a bistable multivibrator circuit consisting of a pair of n-p-n transistors 1, 2, the former having a base electrode 3, collector electrode 4, emitter electrode 5 and the latter a base electrode 6, collector electrode 7, emitter electrode 8; collector electrodes 4 and 7 being connected together in serial relation through individual resistance elements 9, 10, by conductor 11 to the positive fifteen volt terminal of the energy source 12, emitter electrodes 5 and 8 being connected in serial relation by a pair of resistance elements 13, 14, the latter elements having in shunt therewith capacitance element 15 and resistance element 16, the collector 4 of transistor 1 being connected to the base electrode 6 of transistor 2 by conductor 17. There is also shown in this circuit diode 18, having its anode 19 connected to the collector 4 of transistor 1, and its cathode 20 to the positive six-volt terminal of energy source 12 by conductor 21, and diode 22 having its anode 23 connected to the positive 1-volt terminal of energy source 12 by conductor 24 and its cathode 25 connected to collector 4 of transistor 1. It will also be noted that emitter 5 of transistor 1 is connected through resistance element 26 by conductor 27 to the negative fifteen-volt terminal of energy source 12. The numeral 14′ represents the common junction of resistance elements 14, 16 and 26 with emitter 5, while the numeral 17′ represents the junction of anode 19, cathode 25, collector 4 and base 6.

Associated with the multivibrator circuit described heretofore are the elements required to complete the gating circuit which comprises a steering diode 28, having an anode 29 and cathode 30, and a steering diode 31, having an anode 32 and cathode 33, the anodes 29 and 32 being connected to the base electrodes 3 and 6 of transistors 1 and 2 respectively, and the cathodes 30, 33 being coupled together through capacitance element 34. The control potential for the steering gate of the invention is obtained at the junction point "A" of the resistance elements 13, 14 and applied to the cathode 30 of diode 28 through resistance element 35 and conductor 36.

The controlling pulse is obtained from source 37 and applied through resistance element 38 while the output pulse derived from the collector circuit of transistor 2 is applied to the output circuit 39.

The numeral 40 represents the biasing control resistance element.

In the operation of the circuit, assume that transistor 1 is conducting or is on the "on" period. In this state, the base circuit of transistor 1 is grd—38—3—5—27—14′—26—(15 v.)—grd. The output energy circuit is grd—(+15 v.)—10—39—grd, when transistor 2 is non-conducting.

It will also be observed that collector 4 of transistor 1 is connected to the base 6 of transistor 2 and that the junction of these 17′ is connected to the anode 19 of diode 18 and the cathode 25 of diode 22, the cathode 20 and anode 23 being connected to the positive six-volts and positive one-volt terminals respectively of the energy source 12. Thus the collector 4 of transistor 1 and the base 6 of transistor 2 operate only at the steady state of positive six-volts or positive one-volt respectively depending on whether or not transistor 1 is non-conducting.

Assume now that a negative pulse from the source 37 is applied to the cathode 30 of steering diode 28. Since transistor 1 is conducting, its collector 4 at positive one-volt potential, the circuit for collector 4 being grd—(+1 volt)—23—25—17′—4—3—38—grd. Base 6 of transistor 2 is also obviously at positive one-volt potential.

Diode 31 is biased in the reversed direction since its cathode 33 is at positive six-volt potential. Since transistor 2 is non-conducting and hence there is no potential drop in the resistance element 14, the potential at the junction point "A" is the same as the potential of the base 3 of transistor 1 and, since this transistor 1 is conducting, the potential of its emitter 5 is the same as that of the point "A." Since the diode 28 is not biased, the negative pulse applied to the transistor 1 permits it to become non-conducting.

The decreasing current through transistor 1 and hence through resistance element 26, places a negative potential on the emitter 5 of transistor 1 and, hence through resistance element 16 and capacitance element 15, on the emitter 8 of transistor 2. Transistor 2 therefore becomes conducting.

In the above state of stable equilibrium, collector 4 of transistor 1 and base 6 of transistor 2 are at positive six-volt potential, the circuit being 17′—17—6—8—13—A—14—14′—26—(−15 v.)—(+6 v.)—21—20—19—17′. The current flowing through transistor 2 and resistance elements 13, 14 will place a positive potential at the junction point "A" with respect to the potential at emitter 5 of transistor 1 allowing steering diode 28 to be biased in the reversed direction, the circuit being A—36—35—

30—39—3—5—27—14′—14—A. Since however the anode 32 of steering diode 31 is at positive six-volt potential, this anode 32 is not biased in the reversed direction. If another negative polarized pulse is applied from the source 37, this pulse will pass through the capacitance element 34, through cathode 33 and anode 32 of steering diode 31, to the base 6 of transistor 2 which makes this transistor non-conducting again.

It will be understood that the operating and biasing potentials as described in the embodiment and as shown in the diagram are by way of example only. It will further be understood that all NPN type transistors may be directly replaced by PNP type transistors providing that the polarity of the required elements is reversed.

What is claimed is:

1. In combination with a system comprising a control pulse source of one polarity only and an output circuit, a gating circuit connected between the source and the output circuit comprising; a first and second semiconductor device each including a base electrode, a collector electrode and an emitter electrode; a first pair of resistance elements connected in serial relation between the collector electrodes; a second pair of resistance elements connected in serial relation between the emitter electrodes; means for connecting the collector electrode of the first semiconductor device and base electrode of the second semiconductor device; means for energizing the devices; first and second unidirectional impedance elements having their anodes connected to the base electrode of the first and second semiconductor devices respectively, and their cathodes coupled through a capacitance element; a third unidirectional impedance element having its anode connected to the collector electrode of the first semiconductor device and its cathode connected to the means for energizing the devices; a resistance element connected between the cathodes of the second and third impedance elements; a fourth unidirectional impedance element having its cathode connected to the base electrode of the second semiconductor device and its anode connected to the means for energizing the devices; means for connecting the cathode of the first unidirectional impedance element to the junction point of the second pair of resistance elements; means for applying the control pulse to the cathode of the first unidirectional impedance element; means for connecting the collector of the second semiconductor device to the output circuit.

2. An electronic gating circuit comprising in combination a bistable multivibrator consisting of a first and second semiconductor device each including a base electrode, a collector electrode and an emitter electrode; a first pair of resistance elements connected in serial relation between the collector electrodes; a second pair of resistance elements connected in serial relation between the emitter electrodes; means connecting the collector electrode of the first semiconductor device and base electrode of the second semiconductor device; means for energizing the devices; first and second unidirectional impedance elements having their anodes connected to the base electrode of the first and second semiconductor devices respectively, and their cathodes coupled through a capacitance element; a third unidirectional impedance element having its anode connected to the collector electrode of the first semiconductor device and its cathode connected to the means for energizing the devices; a resistance element connected between the cathodes of the second and third impedance elements; a fourth unidirectional impedance element having its cathode connected to the base electrode of the second semiconductor device and its anode connected to the means for energizing the devices; means for connecting the cathode of the first unidirectional impedance element to the junction point of the second pair of resistance elements.

References Cited in the file of this patent

UNITED STATES PATENTS

| | | |
|---|---|---|
| 2,787,712 | Priebe et al. | Apr. 2, 1957 |
| 2,817,772 | Lee | Dec. 24, 1957 |
| 2,880,330 | Linvill et al. | Mar. 31, 1959 |